(12) United States Patent
Schmidt et al.

(10) Patent No.: US 10,958,360 B2
(45) Date of Patent: Mar. 23, 2021

(54) TRANSCEIVER AND METHOD FOR DISTANCE MEASUREMENT

(71) Applicant: Fraunhofer-Gesellschaft zur Foerderung der angewandten Forschung e.V., Munich (DE)

(72) Inventors: Philip Schmidt, Duisburg (DE); Frederic Meyer, Duisburg (DE); Peter Kuhn, Duisburg (DE); Gerd Vom Boegel, Duisburg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/786,612

(22) Filed: Feb. 10, 2020

(65) Prior Publication Data

US 2020/0259571 A1    Aug. 13, 2020

(30) Foreign Application Priority Data

Feb. 11, 2019    (DE) .......................... 102019201742.8

(51) Int. Cl.
*H04B 17/10* (2015.01)
*H04B 1/38* (2015.01)
*H04B 17/23* (2015.01)

(52) U.S. Cl.
CPC ............ *H04B 17/103* (2015.01); *H04B 1/38* (2013.01); *H04B 17/102* (2015.01); *H04B 17/23* (2015.01)

(58) Field of Classification Search
CPC .................................................... H04B 17/27
See application file for complete search history.

(56) References Cited

U.S. PATENT DOCUMENTS

| | | | | |
|---|---|---|---|---|
| 4,893,125 A | * | 1/1990 | May ..................... | G01S 13/348 342/129 |
| 7,767,637 B2 | * | 8/2010 | Simandl ................ | C09D 9/005 510/201 |
| 10,670,705 B2 | * | 6/2020 | Malinovskiy .......... | G01S 7/352 |

OTHER PUBLICATIONS

"Wikipedia, "Dauerstrichradar"", Dec. 7, 2018.

* cited by examiner

*Primary Examiner* — Hsinchun Liao
(74) *Attorney, Agent, or Firm* — Perkins Coie LLP; Michael A. Glenn (57) ABSTRACT

A transceiver for distance measurements between the transceiver and an apparatus is provided. The transceiver has a transmitter configured to emit a first signal portion to be emitted at a first center frequency and a second signal portion to be emitted at a second center frequency so that the first signal portion to be emitted is radiated back from the apparatus to the transceiver as a first reflected signal portion and so that the second signal portion to be emitted is radiated back from the apparatus to the transceiver as a second reflected signal portion. In addition, the transceiver has a receiver configured to receive the first reflected signal portion radiated back from the apparatus to the transceiver and the second reflected signal portion radiated back from the apparatus to the transceiver. Furthermore, the transceiver has a measuring module configured to determine a distance between the transceiver and the apparatus.

21 Claims, 4 Drawing Sheets

TRANSCEIVER AND METHOD FOR DISTANCE MEASUREMENT

CROSS-REFERENCE TO RELATED APPLICATIONS

This application claims priority from German Application No. 102019201742.8, which was filed on Feb. 11, 2019, and is incorporated herein by reference in its entirety.

BACKGROUND OF THE INVENTION

The application relates to distance measurements between two radio communication apparatuses, subsequently referred to as reader and transponder.

There are different measuring concepts for determining the distance between a reader and a transponder or determining the position of the transponder.

In "received signal phase/phase of arrival", the phase delta between the carrier signal emitted by the reader and that received by the reader is determined. When the wavelength of the "measuring frequency" is shorter than the distance to be resolved, multiples of the wavelength have to be determined using a temporal resolution in order to obtain the correct distance.

In "angle of arrival", the phase position of the transponder signal (received signal phase) is determined at two receiver modules of the reader in an antenna array for the individual array elements. An angle can be determined for each antenna array by the different phase values and the known signal run time. The position of the transponder can then be determined from the established angle of the two receiver modules and the known distance between the receiver modules.

In "received signal strength indication", when the transmission power and the antenna gain of the reader and the transponder are known, the distance between the reader and the transponder can be determined using the established field strength and the known free-field attenuation.

In "time of arrival", a defined point in time and a synchronized temporal basis between the communication modules (reader/transponder), like a time stamp, for example, must be present. The run time can be determined from the delta between the transmission and the reception time stamp and, from the run time, the distance between the reader and the transponder can be determined using the speed of light. However, the time stamp need not necessarily be transmitted. Highly precise clock synchronization is a prerequisite for time of arrival.

In "time difference of arrival", a transponder emits a signal which is received at three receivers/readers. The position/distance of the transponder can be determined using the synchronized temporal basis between the transponder and the receivers, the known position of the three receivers and the speed of light (highly precise clock synchronization is a prerequisite here).

In another method, the phase difference of the modulated baseband signal between the transmission and the receive signal is determined in the reader, from which in turn the distance can be derived. Since the wavelength of the baseband signal is considerably greater than the wavelength of the carrier signal, the phase difference established in the baseband can be associated to an unambiguous distance. Suitably selecting the modulation rate is a prerequisite here.

SUMMARY

According to an embodiment, a transceiver for distance measurements between the transceiver and an apparatus may have: a transmitter configured to emit a first signal portion to be emitted at a first center frequency and a second signal portion to be emitted at a second center frequency so that the first signal portion to be emitted is radiated back from the apparatus to the transceiver as a first reflected signal portion and so that the second signal portion to be emitted is radiated back from the apparatus to the transceiver as a second reflected signal portion, a receiver configured to receive the first reflected signal portion radiated back from the apparatus to the transceiver and the second reflected signal portion radiated back from the apparatus to the transceiver, and a measuring module configured to determine a distance between the transceiver and the apparatus, wherein the measuring module is configured to determine the distance between the transceiver and the apparatus in dependence on a first phase difference between a first phase position of the first signal portion to be emitted and a second phase position of the second signal portion to be emitted, and in dependence on a second phase difference between a third phase position of the first reflected signal portion and a fourth phase position of the reflected signal portion, wherein the measuring module is configured to determine the distance between the transceiver and the apparatus in dependence on the first phase difference and on the second phase difference such that the measuring module determines the distance between the transceiver and the apparatus in dependence on a difference between the second phase difference and the first phase difference.

According to another embodiment, a method for distance measurements between a transceiver and an apparatus may have the steps of: emitting a first signal portion to be emitted at a first center frequency and a second signal portion to be emitted at a second center frequency by a transmitter of the transceiver so that the first signal portion to be emitted is radiated back from the apparatus to the transceiver as a first reflected signal portion and so that the second signal portion to be emitted is radiated back from the apparatus to the transceiver as a second reflected signal portion, receiving the first reflected signal portion radiated back from the apparatus to the transceiver by a receiver of the transceiver and receiving the second reflected signal portion radiated back from the apparatus to the transceiver by the receiver of the transceiver, and determining a distance between the transceiver and the apparatus by a measuring module of the transceiver, wherein the distance between the transceiver and the apparatus is determined by the measuring module of the transceiver in dependence on a first phase difference between a first phase position of the first signal portion to be emitted and a second phase position of the second signal portion to be emitted and in dependence on a second phase difference between a third phase position of the first reflected signal portion and a fourth phase position of the second reflected signal portion, and wherein the distance between the transceiver and the apparatus is determined by the measuring module of the transceiver in dependence on the first phase difference and on the second phase difference such that the measuring module of the transceiver determines the distance between the transceiver and the apparatus in dependence on a difference between the second phase difference and the first phase difference.

Another embodiment may have a non-transitory digital storage medium having stored thereon a computer program for performing the above-described method for distance measurements between a transceiver and an apparatus.

BRIEF DESCRIPTION OF THE DRAWINGS

Embodiments of the invention will be detailed subsequently referring to the appended drawings, in which.

DETAILED DESCRIPTION OF THE INVENTION

Figure 1A:
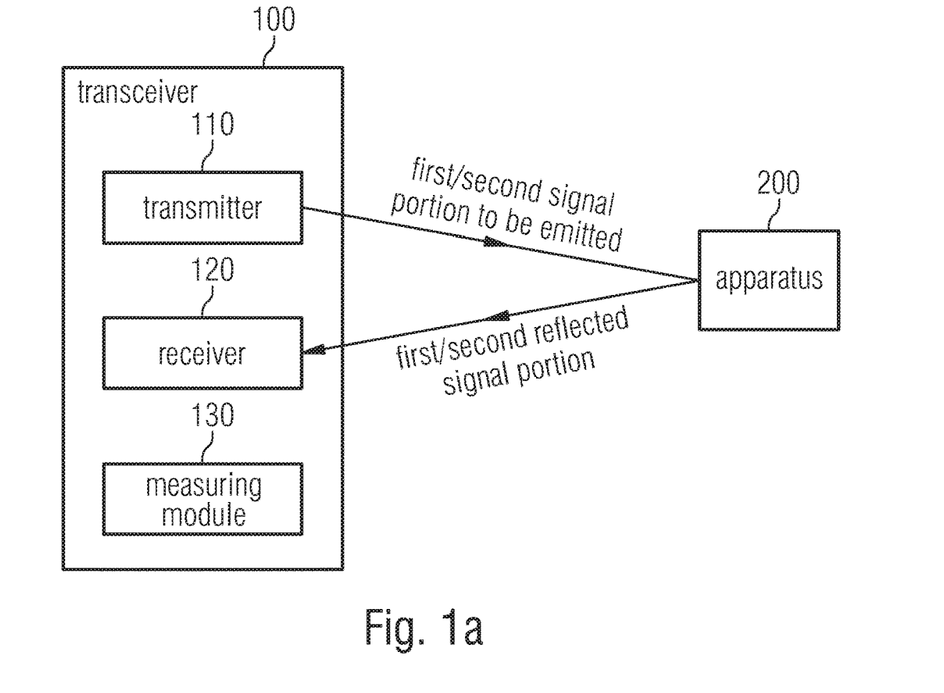
FIG. 1a shows a transceiver in accordance with an embodiment and an apparatus a distance to which is determined.

FIG. 1a shows a transceiver 100 for distance measurements between the transceiver 100 and an apparatus 200 in accordance with an embodiment.

The transceiver 100 comprises a transmitter 110 configured to emit a first signal portion to be emitted at a first center frequency and a second signal portion to be emitted at a second center frequency so that the first signal portion to be emitted is radiated back from the apparatus 200 to the transceiver 100 as a first reflected signal portion and so that the second signal portion to be emitted is radiated back from the apparatus 200 to the transceiver 100 as a second reflected signal portion.

Additionally, the transceiver 100 comprises a receiver 120 configured to receive the first reflected signal portion radiated back from the apparatus 200 to the transceiver 100 and the second reflected signal portion radiated back from the apparatus 200 to the transceiver 100.

Furthermore, the transceiver 100 comprises a measuring module 130 configured to determine a distance between the transceiver 100 and the apparatus 200. The measuring module 130 is configured to determine the distance between the transceiver 100 and the apparatus 200 in dependence on a first phase difference between a first phase position of the first signal portion to be emitted and a second phase position of the second signal portion to be emitted and in dependence on a second phase difference between a third phase position of the first reflected signal portion and a fourth phase position of the second reflected signal portion. Thus, the measuring module 130 is configured to determine the distance between the transceiver 100 and the apparatus 200 in dependence on the first phase difference and on the second phase difference such that the measuring module 130 determines the distance between the transceiver 100 and the apparatus 200 in dependence on a difference between the second phase difference and the first phase difference.

The measuring module 130 may exemplarily comprise a switching circuit or a processor, for example.

Embodiments are based on the fact that the phase difference of two signal portions having different center frequencies changes in dependence on the elapsed time, in dependence on the frequency difference of the two center frequencies. The more time elapses, the greater becomes the phase difference, until the phase position of the signal portion at the greater center frequency has lapped or outstripped the other phase position of the other signal portion at the smaller center frequency. Unless exceeding this upper threshold, the difference between the first phase difference and the (second) phase difference in the reflected signal portions allows drawing a conclusion as to the time elapsed from emitting the two signal portions until receiving same after being reflected back. By means of the speed of light, the covered distance of the carrier signals having the two signal portions can be determined based on the frequency differences of the center frequencies, wherein the distance covered corresponds to double the distance between the transceiver and the apparatus.

In embodiments, for measuring distances in a reader, for example, the phase difference of the modulated baseband signal between the transmit and the receive signal is determined, from which in turn the distance can be derived. Since the wavelength of the baseband signal is considerably greater than the wavelength of the carrier signal, the established phase difference in the baseband can be associated to an unambiguous distance. Suitably selecting the modulation rate is a prerequisite here.

In accordance with an embodiment, the first phase position can, for example, indicate a phase position of the first signal portion to be emitted at a first point in time, wherein the second phase position can, for example, indicate a phase position of the second signal portion to be emitted at said first point in time, wherein the third phase position can, for example, indicate a phase position of the first reflected signal portion at a second point in time, and wherein the fourth phase position can, for example, indicate a phase position of the second reflected signal portion at said second point in time. Thus, the measuring module 130 can be configured to determine the second phase difference between the third phase position of the first reflected signal portion and the fourth phase position of the second reflected signal portion for said second point in time, for example.

In an embodiment, a transmission starting point in time can, for example, indicate a point in time at which the transmitter 110 starts emitting both the first signal portion to be emitted and the second signal portion to be emitted, wherein a reception starting point in time can, for example, indicate a point in time at which the receiver 120 firstly receives both the first reflected signal portion and the second reflected signal portion, wherein a first time difference can, for example, indicate a first time difference between the first point in time and the transmission starting point in time, wherein a second time difference can, for example, indicate a second time difference between the second point in time and the reception starting point in time. Thus, the measuring module 130 can be configured to determine the second phase difference for the second point in time at which the second time difference equals the first time difference.

In accordance with an embodiment, the transmission starting point in time and the first point in time may be equal so that the first time difference is 0. Thus, the measuring module 130 can be configured to determine the second phase difference for the reception starting point in time so that the reception starting point in time and the second point in time are equal and so that the second time difference is 0.

Figure 5A:
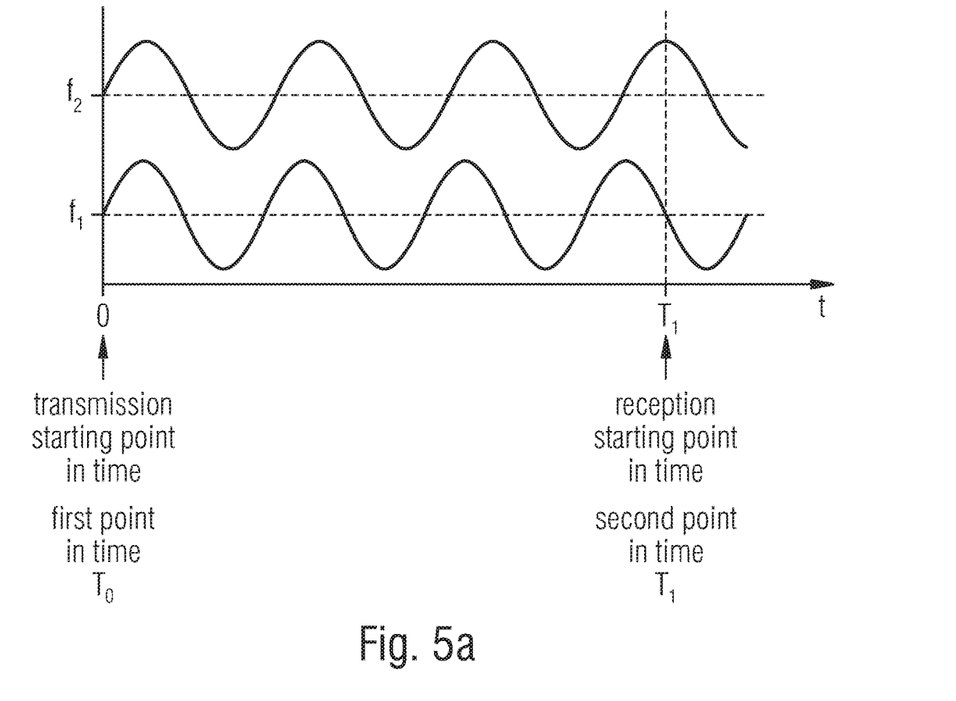
FIG. 5a shows a first signal portion and a second signal portion in an example in accordance with an embodiment.

This embodiment is illustrated in FIG. 5a. Here, the first point in time (that point in time which is decisive for the first phase difference) and the transmission starting point in time are identical. Correspondingly, the second point in time (that point in time decisive for the second phase difference) and the reception starting point in time are also identical.

In FIG. 5a, one can see that the first signal portion (signal portion at the top of FIG. 5a) and the second signal portion (signal portion at the bottom of FIG. 5a) comprise equal phase positions (first phase position=second phase position=0°) at the first point in time (To). Correspondingly, the first phase difference is 0°.

At the second point in time ($T_1$), both the phase position of the first signal portion (third phase position) and the phase position of the second signal portion (fourth phase position) have changed. Whereas the third phase position of the top first signal portion is at 90°, the fourth phase position of the bottom signal portion is at approximately 170°. The second phase difference in FIG. 5a consequently is approximately 80°. The result is a difference between the second phase difference (approximately 80°) and the first phase difference (0°) of approximately 80°.

Figure 5B:
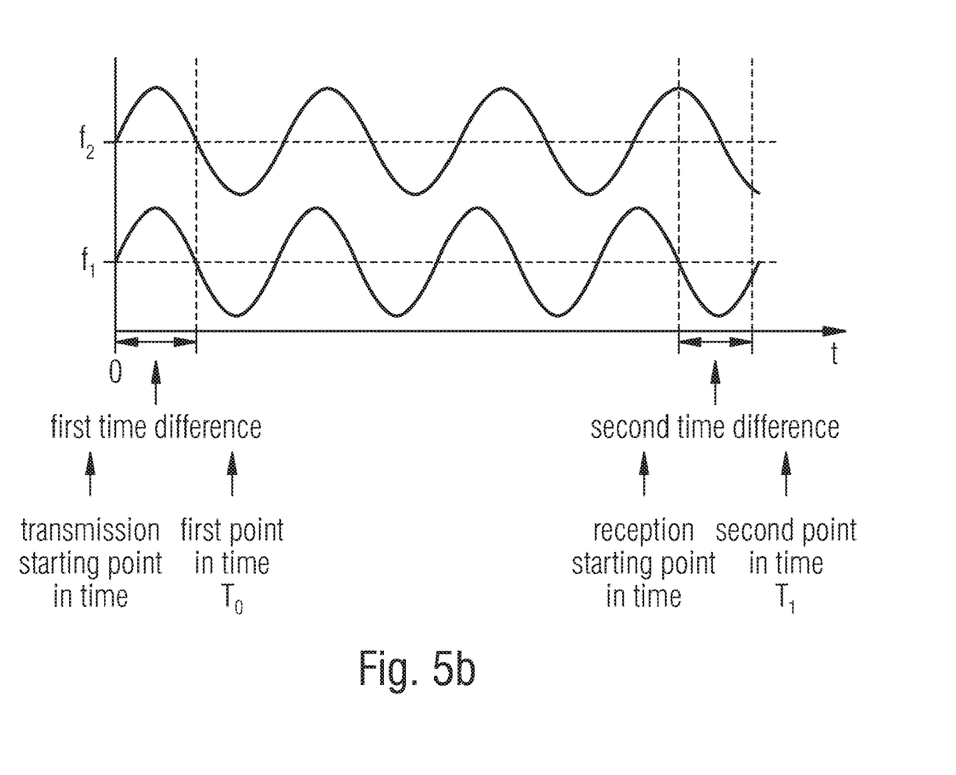
FIG. 5b shows a first signal portion and a second signal portion in an example in accordance with another embodiment.

In another embodiment, the transmission starting point in time can, for example, be temporally before the first point in time so that the first time difference is greater than 0. Thus, the measuring module 130 can, for example, be configured to determine the second phase difference for the second point in time so that the second time difference equals the first time difference and so that the reception starting point in time is temporally before the second point in time.

This embodiment is illustrated in FIG. 5b. Here, the transmission starting point in time is temporally before the first point in time (that point in time decisive for the first phase difference). Correspondingly, the second point in time (that point in time which is decisive for the second phase difference) is selected such that the reception starting point in time is temporally before the second point in time. The second point in time was selected such that the second time difference between the second point in time and the reception starting point in time equals the first time difference between the first point in time and the transmission starting point in time.

In FIG. 5b, one can see that the first signal portion (signal portion at the top of FIG. 5b) comprises a first phase position of approximately 170° at the first point in time (To). The second signal portion (signal portion at the bottom of FIG. 5b) comprises a second phase position of approximately 180° at the first point in time (To). Correspondingly, the first phase difference is approximately 10°.

Additionally, one can see in FIG. 5b that the first signal portion comprises a third phase position of approximately 225° at the second point in time ($T_1$). The second signal portion comprises a fourth phase position of approximately 345° at the second point in time ($T_1$). Correspondingly, the second phase difference is approximately 90°. The resulting difference between the second phase difference (approximately 90°) and the first phase difference (10°) is approximately 80°.

In accordance with an embodiment, the first phase difference and the first time difference can, for example, be predefined.

In an embodiment, a difference value can, for example, indicate a difference between the second phase difference and the first phase difference. The measuring module 130 can, for example, be configured to determine the distance between the transceiver 100 and the apparatus 200 such that the distance determined by the measuring module 130 linearly increases with the difference value in a predefined range of values of the difference value, wherein the predefined range of values can, for example, be between 0 or 0° and an upper value, wherein the upper value can be greater than 0 or greater than 0°.

In accordance with an embodiment, the upper value can, for example, be a value w, with 90°≤w<360°, wherein the first phase difference and the second phase difference are determined in degree measure. Or else, the upper value can, for example, be a value w, with $$\frac{\pi}{2} \leq w < 2\pi,$$

wherein the first phase difference and the second phase difference are determined in radian measure.

In one embodiment, the measuring module 130 can be configured to determine the distance between the transceiver 100 and the apparatus 200 in dependence on the speed of light.

In accordance with an embodiment, the measuring module 130 can, for example, be configured to determine the distance between the transceiver 100 and the apparatus 200 in dependence on the wavelength difference between a second wavelength to the second center frequency of the second signal portion to be emitted and a first wavelength to the first center frequency of the first signal portion to be emitted.

In an embodiment, the measuring module 130 can, for example, be configured to determine the distance between the transceiver 100 and the apparatus 200 in dependence on:

$$l = \frac{1}{2} \cdot (\Delta\varphi_{a,T=1} - \Delta\varphi_{a,T=0}) \cdot \frac{\lambda_a}{360°} \text{ or}$$

$$l = \frac{1}{2} \cdot (\Delta\varphi_{a,T=1} - \Delta\varphi_{a,T=0}) \cdot \frac{\lambda_a}{2\pi},$$

wherein l is the distance, wherein $\Delta\varphi_{a,T=0}$ is the first phase difference, wherein $\Delta\varphi_{a,T=1}$ is the second phase difference, and wherein:

$$\lambda_a = \frac{c_0}{|f_2 - f_1|},$$

wherein $c_0$ is the speed of light, wherein $f_2$ is the second center frequency, and wherein $f_1$ is the first center frequency.

In accordance with an embodiment, the transmitter 110 can, for example, be configured to emit a signal which comprises the first signal portion to be emitted and the second signal portion to be emitted.

Figure 1B:
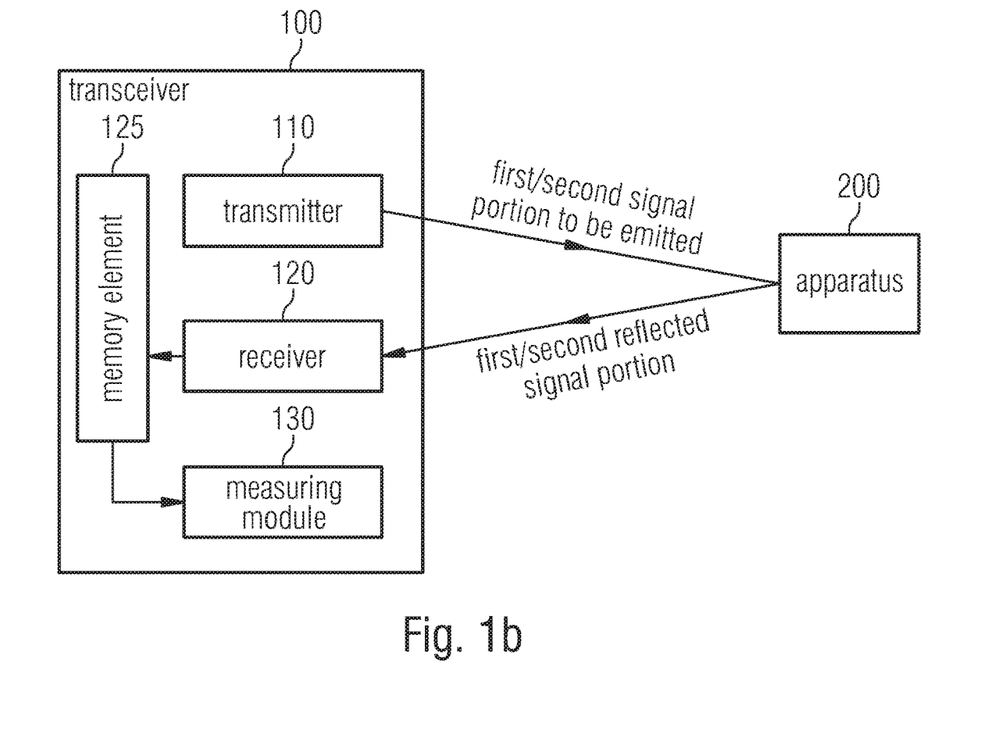
FIG. 1b shows a transceiver in accordance with another embodiment and an apparatus a distance to which is determined.

FIG. 1b shows an embodiment of the transceiver 100 further comprising a memory element 125 for storing the first reflected signal portion and the second reflected signal portion. In the embodiment of FIG. 1b, the measuring module 130 is configured to access the first signal portion stored in the memory element 125 and the second signal portion stored in the memory element 125 in order to determine the second phase difference.

Such a memory element 125, for example, allows storing the first and second reflected signal portions and reliably determining, for example, at the latest after a short time offset of, for example, one period of the first and second signal portions, using the stored reflected first signal portion, which (third) phase position was present for the first reflected signal portion at the second point in time $T_1$ and reliably determining, using the stored reflected second signal portion, which (fourth) phase position was present for the second reflected signal portion at the second point in time $T_1$. Here, the maximums, minimums and zero crossings of the first signal portion can, for example, be analyzed in order to determine the phase position of the first signal portion at the point in time $T_1$. The maximums, minimums and zero crossings of the second signal portion can, for example, also be analyzed in order to determine the phase position of the second signal portion at the point in time $T_1$.

In accordance with an embodiment, the transceiver 100 can, for example, be configured to perform, after firstly determining the distance between the transceiver 100 and the apparatus, for improving the precision, a second determination of the distance between the transceiver 100 and the apparatus where the first center frequency and/or the second center frequency has changed compared to the first determination of the distance.

Figure 1C:
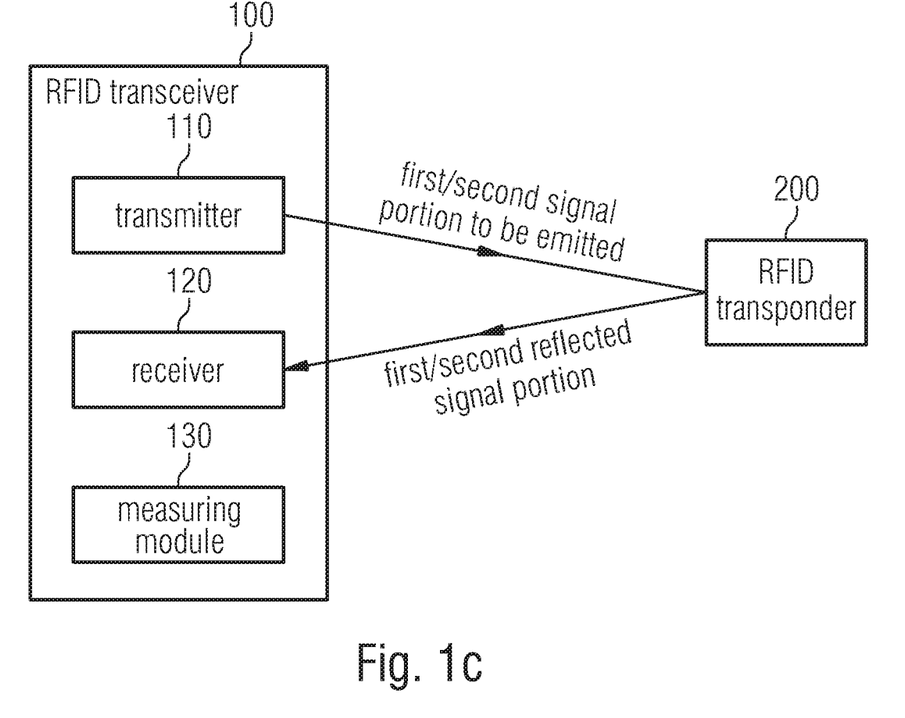
FIG. 1c shows an RFID reader and an RFID transponder in accordance with an embodiment.

FIG. 1c shows a transceiver 100 being an RFID transceiver, the apparatus 200 being an RFID transponder.

In accordance with an embodiment, the transceiver 100 can be an RFID reader.

In an embodiment, the transmitter 110 can, for example, be configured to emit a carrier signal which can be modulated by the RFID transponder, the carrier signal comprising the first signal portion and the second signal portion.

In accordance with an embodiment, a system comprising the transceiver 100 as described above and the apparatus 200 as described above is provided.

In an embodiment, a system comprising the RFID reader as described above and the RFID transponder as described above is provided.

Special embodiments of the invention will be described below.

Embodiments are based on determining the distance between the reader and the base station by means of the signal transmitted on the radio interface.

Some embodiments are based on a radio frequency identification (RFID) system comprising a reader and at least one transponder.

In RFID, in the ultra-high frequency (UHF) range, for example, or using magnetic coupling, like in the low frequency (LF) range and high frequency (HF) range, only a limited and small amount of energy is usually available on the part of the transponder.

The transponders relevant for the system or the invention are such transponders where a so-called load modulation or "back scatter modulation" is employed. The reader may comprise one or several antennas, wherein the transmission and the reception path can commonly use one antenna, or use different antennas, see FIG. 2. In the RFID systems described, additionally, data can be transmitted from the reader to the transponder and from the transponder to the reader. Additionally, the energy consumed for transponder operation can be transmitted from the reader to the transponder so that the transponder does not have to have its own energy source.

Figure 2:
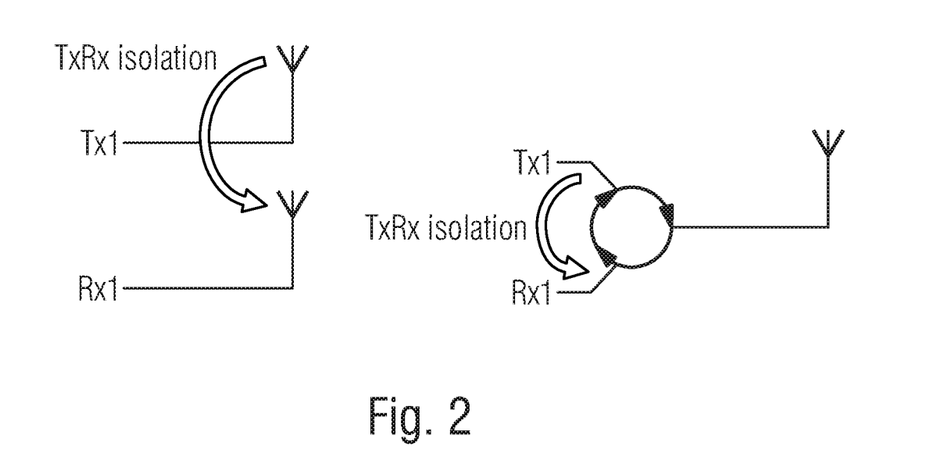
FIG. 2 shows a possible constellation of antennas at the reader in accordance with an embodiment.

FIG. 2 shows a possible antenna constellation at the reader in accordance with an embodiment.

In accordance with the present invention, the RFID system basically described before (known technology) is extended in that a carrier signal (signal from the reader to the transponder) is emitted, consisting of at least two signal portions which approximately comprise equal energies. The signal portions mainly differ in the center frequencies ($f_1$, $f_2$) so that there is a frequency difference $\Delta f_a$ between the two signal portions (see FIG. 3).

Figure 3:
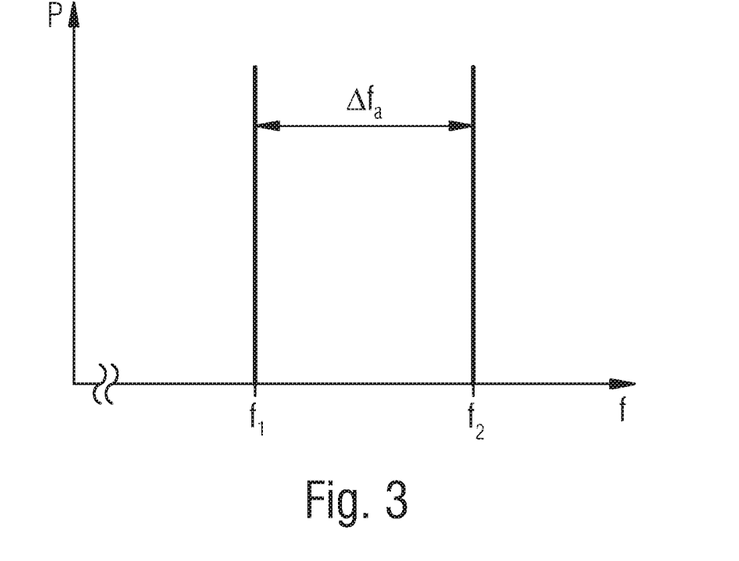
FIG. 3 shows a carrier signal in accordance with an embodiment.

FIG. 3 shows a carrier signal in accordance with an embodiment.

Figure 4:
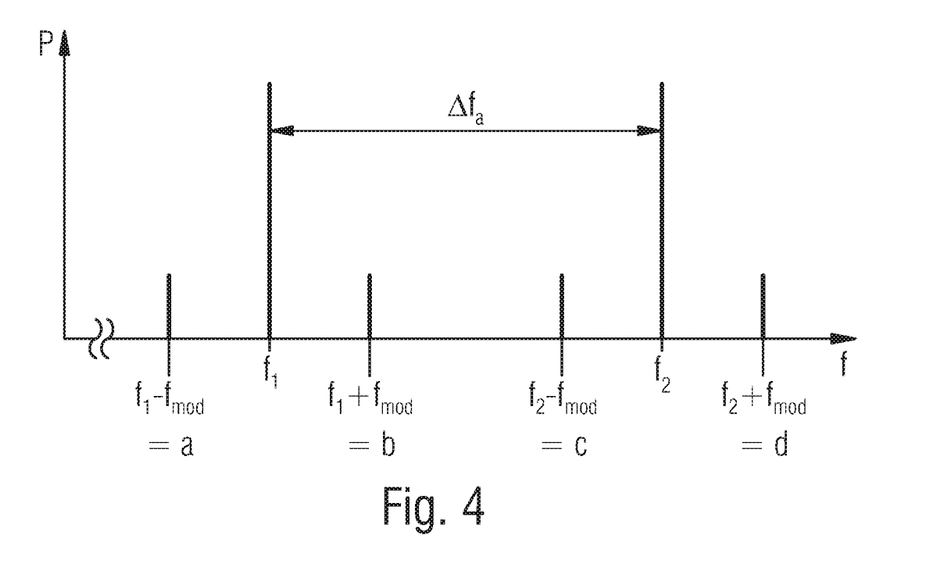
FIG. 4 shows signal portions in the receive path of a reader in accordance with an embodiment.

Expressed in a simplified manner, the result, after the load modulation of the carrier signal illustrated in FIG. 3 at one of the transponders described before, is the spectral characteristic in the receive path of the reader as is illustrated in FIG. 4.

FIG. 4 shows signal portions in the receive path of the reader in accordance with an embodiment.

Apart from the carrier signals (see FIG. 3), the signal portions of the transponder signal (modulation sidebands {a, b, c, d}) are illustrated in FIG. 4.

The difference between the modulation sidebands (a & c) and (b & d), apart from the frequency difference $\Delta f_a$, is a different phase position, or phase difference $\Delta \varphi_a$. The variation by $\Delta \varphi_a$ here can be attributed to the different run times of the carrier signal portions ($f_1$, $f_2$).

The distance between the reader and the transponder can be determined on the basis of the phase difference $\Delta \varphi_a$ and in dependence on the set frequency difference $\Delta f_a$, or corresponding wavelength $\Delta \lambda_a$.

Ideally, the phase $\varphi_a$ of the frequency difference $\Delta f_a$, or the corresponding wavelength $\lambda_a$ is unambiguous over the distance between (reader-transponder-reader). In order to achieve this, a suitable frequency difference $\Delta f_a$ is to be set, via selecting $f_1$ and $f_2$, in dependence on the distance to be resolved.

Calculating the distance to be resolved per degree of phase difference ($d_{a/°}$) is done as follows:

$$\Delta f_a = f_2 - f_1 \rightarrow \lambda_a = \frac{c_0}{\Delta f_a}, \text{ with } c_0 = 299.792.458 \frac{m}{s} \rightarrow d_{a/°} = \frac{\lambda_a}{360°}$$

FIG. 5a shows an example in accordance with an embodiment.

In the following example, the carrier signal portions $f_1$ and $f_2$ are emitted by the reader at a known phase position at the point in time t=0 (for a simplified illustration, the same phase position is assumed in this example for $f_1$ and $f_2$).

After a corresponding carrier signal covered the distance between, for example, (reader-transponder-reader) at the point in time $T_1$, the carrier signal portions $f_1$ and $f_2$ comprise a different phase difference $\Delta \varphi_a$ relative to the point in time t=0.

On the basis of the known phase difference $\varphi_{a,t=0}$ at the point in time t=0 and the known phase difference $\Delta \varphi_{a,T_1}$ at the point in time $T_1$, the distance covered can be determined while considering the set carrier signal portions $f_1$ and $f_2$, or correspondingly the resulting frequency difference $\Delta f_a$.

Numerical Example $$f_1 = 5800 \text{ MHz}, f_2 = 5810 \text{ MHz}$$
$$\rightarrow \Delta f_a = f_2 - f_1 = 10 \text{ MHz}$$
$$\rightarrow \lambda_a = \frac{c_0}{\Delta f_a} = 29{,}9892 \text{ m},$$
$$\text{with } c_0 = 299.792.458 \frac{m}{s}$$
$$\rightarrow d_{a/°} = \frac{\lambda_a}{360°} = 0{,}0833 \frac{m}{°}$$

a phase difference $\Delta \varphi_a$ of 1° at the point in time $T_1$ in this example means that the distance covered is 8.33 cm.

In order to improve the distance measurement, the frequency of one or several carrier signals can be shifted/varied (sweep or modulation, for example) and be evaluated correspondingly. Apart from improving the precision, this approach can additionally be used in order to establish a potential movement (Doppler shift) of the transponder.

In summary, the invention described here deals with making use of the difference $\lambda_{distance}$ ($\Delta$phase, $\Delta$frequency) between the frequency difference $\Delta f_a$ in an RFID system with a multi-frequency carrier for distance measurement purposes.

Embodiments may, for example, be employed for determining the positions of passive transponders in trade and logistics, or for automated logistics handling, for example, object detection by robots, or for authentication purposes or for access control systems.

A conventional transponder can, for example, be used as the basis for distance measurements between a reader and a transponder in accordance with embodiments. In order to realize an RFID system including the distance measurement described here, only the reader front end has to be adapted and supplemented by the corresponding evaluation circuit.

Although some aspects have been described in the context of an apparatus, it is clear that these aspects also represent a description of the corresponding method, such that a block or device of an apparatus also corresponds to a respective method step or feature of a method step. Analogously, aspects described in the context with or as a method step also represent a description of a corresponding block or item or feature of a corresponding apparatus. Some or all of the method steps may be executed by (or using) a hardware apparatus, like, for example, a microprocessor, a programmable computer or an electronic circuit. In some embodiments, some or several of the most important method steps may be executed by such an apparatus.

Depending on certain implementation requirements, embodiments of the invention can be implemented in hardware or in software or at least partly in hardware or at least party in software. The implementation can be performed using a digital storage medium, for example a floppy disk, a DVD, a Blu-Ray disc, a CD, an ROM, a PROM, an EPROM, an EEPROM or a FLASH memory, a hard drive or another magnetic or optical memory having electronically readable control signals stored thereon, which cooperate or are capable of cooperating with a programmable computer system such that the respective method is performed. Therefore, the digital storage medium may be computer-readable.

Some embodiments according to the invention include a data carrier comprising electronically readable control signals, which are capable of cooperating with a programmable computer system such that one of the methods described herein is performed.

Generally, embodiments of the present invention can be implemented as a computer program product with program code, the program code being operative for performing one of the methods when the computer program product runs on a computer.

The program code may, for example, be stored on a machine-readable carrier.

Other embodiments comprise the computer program for performing one of the methods described herein, wherein the computer program is stored on a machine-readable carrier. In other words, an embodiment of the inventive method is, therefore, a computer program comprising program code for performing one of the methods described herein, when the computer program runs on a computer.

A further embodiment of the inventive methods is, therefore, a data carrier (or a digital storage medium or a computer-readable medium) comprising, recorded thereon, the computer program for performing one of the methods described herein. The data carrier or the digital storage medium or the computer-readable medium is typically tangible and/or non-volatile.

A further embodiment of the inventive method is, therefore, a data stream or a sequence of signals representing the computer program for performing one of the methods described herein. The data stream or the sequence of signals may, for example, be configured to be transferred via a data communication connection, for example via the Internet.

A further embodiment comprises processing means, for example a computer, or a programmable logic device, configured or adapted to perform one of the methods described herein.

A further embodiment comprises a computer having installed thereon the computer program for performing one of the methods described herein.

A further embodiment according to the invention comprises an apparatus or system configured to transfer a computer program for performing at least one of the methods described herein to a receiver. The transmission can, for example, be performed electronically or optically. The receiver may, for example, be a computer, a mobile device, a memory device or the like. The apparatus or system may, for example, comprise a file server for transferring the computer program to the receiver.

In some embodiments, a programmable logic device (for example a field-programmable gate array, FPGA) may be used to perform some or all of the functionalities of the methods described herein. In some embodiments, a field-programmable gate array may cooperate with a microprocessor in order to perform one of the methods described herein. Generally, in some embodiments, the methods are performed by any hardware apparatus. This can be universally applicable hardware, such as a computer processor (CPU), or hardware specific for the method, such as an ASIC.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A transceiver for distance measurements between the transceiver and an apparatus, the transceiver comprising:
   a transmitter configured to emit a first signal portion to be emitted at a first center frequency and a second signal portion to be emitted at a second center frequency so that the first signal portion to be emitted is radiated back from the apparatus to the transceiver as a first reflected signal portion and so that the second signal portion to be emitted is radiated back from the apparatus to the transceiver as a second reflected signal portion,
   a receiver configured to receive the first reflected signal portion radiated back from the apparatus to the transceiver and the second reflected signal portion radiated back from the apparatus to the transceiver, and a measuring module configured to determine a distance between the transceiver and the apparatus, wherein the measuring module is configured to determine the distance between the transceiver and the apparatus in dependence on a first phase difference between a first phase position of the first signal portion to be emitted and a second phase position of the second signal portion to be emitted, and in dependence on a second phase difference between a third phase position of the first reflected signal portion and a fourth phase position of the second reflected signal portion, wherein the measuring module is configured to determine the distance between the transceiver and the apparatus in dependence on the first phase difference and on the second phase difference such that the measuring module determines the distance between the transceiver and the apparatus in dependence on a difference between the second phase difference and the first phase difference.

2. The transceiver in accordance with claim 1,
wherein the first phase position indicates a phase position of the first signal portion to be emitted at a first point in time, wherein the second phase position indicates a phase position of the second signal portion to be emitted at said first point in time, wherein the third phase position indicates a phase position of the first reflected signal portion at a second point in time, wherein the fourth phase position indicates a phase position of the second reflected signal portion at said second point in time, and wherein the measuring module is configured to determine the second phase difference between the third phase position of the first reflected signal portion and the fourth phase position of the second reflected signal portion for said second point in time.

3. The transceiver in accordance with claim 2,
wherein a transmission starting point in time indicates a point in time at which the transmitter starts emitting both the first signal portion to be emitted and the second signal portion to be emitted, wherein a reception starting point in time indicates a point in time at which the receiver firstly receives both the first reflected signal portion and the second reflected signal portion, wherein a first time difference indicates a first time difference between the first point in time and the transmission starting point in time, wherein a second time difference indicates a second time difference between the second point in time and the reception starting point in time, and wherein the measuring module is configured to determine the second phase difference for the second point in time at which the second time difference equals the first time difference.

4. The transceiver in accordance with claim 3,
wherein the transmission starting point in time and the first point in time are equal so that the first time difference is 0, and wherein the measuring module is configured to determine the second phase difference for the reception starting point in time so that the reception starting point in time and the second point in time are equal and so that the second time difference is 0.

5. The transceiver in accordance with claim 3,
wherein the transmission starting point in time is temporally before the first point in time so that the first time difference is greater than 0, and wherein the measuring module is configured to determine the second phase difference for the second point in time so that the second time difference equals the first time difference and so that the reception starting point in time is temporally before the second point in time.

6. The transceiver in accordance with claim 3,
wherein the first phase difference is predefined, and wherein the first time difference is predefined.

7. The transceiver in accordance with claim 3,
wherein a difference value indicates a difference between the second phase difference and the first phase difference, and wherein the measuring module is configured to determine the distance between the transceiver and the apparatus so that the distance determined by the measuring module linearly increases with the difference value in a predefined range of values of the difference value, wherein the predefined range of values is between 0 or 0° and an upper value, the upper value being greater than 0 or greater than 0°.

8. The transceiver in accordance with claim 7,
wherein the upper value is a value w, with 90°≤w<360°, wherein the first phase difference and the second phase difference are determined in degree measure, or wherein the upper value is a value w, with $$\frac{\pi}{2} \leq w < 2\pi,$$

wherein the first phase difference and the second phase difference are determined in radian measure.

9. The transceiver in accordance with claim 3,
wherein the measuring module is configured to determine the distance between the transceiver and the apparatus in dependence on the speed of light.

10. The transceiver in accordance with claim 3,
wherein the measuring module is configured to determine the distance between the transceiver and the apparatus in dependence on the wavelength difference between a second wavelength to the second center frequency of the second signal portion to be emitted and a first wavelength to the first center frequency of the first signal portion to be emitted.

11. The transceiver in accordance with claim 3,
wherein the measuring module is configured to determine the distance between the transceiver and the apparatus in dependence on:

$$l = \frac{1}{2} \cdot (\Delta\varphi_{a,T=1} - \Delta\varphi_{a,T=0}) \cdot \frac{\lambda_a}{360°} \text{ or } l = \frac{1}{2} \cdot (\Delta\varphi_{a,T=1} - \Delta\varphi_{a,T=0}) \cdot \frac{\lambda_a}{2\pi},$$

wherein l is the distance,
wherein $\Delta\varphi_{a,T=0}$ is the first phase difference,
wherein $\Delta\varphi_{a,T=1}$ is the second phase difference, and
wherein $$\lambda_a = \frac{c_0}{|f_2 - f_1|},$$

wherein $c_0$ is the speed of light,
wherein $f_2$ is the second center frequency, and
wherein $f_1$ is the first center frequency.

12. The transceiver in accordance with claim 1, wherein the transmitter is configured to emit a signal comprising the first signal portion to be emitted and the second signal portion to be emitted.

13. The transceiver in accordance with claim 1, the transceiver additionally comprising a memory element for storing the first reflected signal portion and the second reflected signal portion,
wherein the measuring module is configured to access the first signal portion stored in the memory element and the second signal portion stored in the memory element in order to determine the second phase difference.

14. The transceiver in accordance with claim 1, the transceiver being configured to perform, after having first determined the distance between the transceiver and the apparatus, in order to improve the precision, a second determination of the distance between the transceiver and the apparatus where the first center frequency and/or the second center frequency have changed relative to the first determination of the distance.

15. The transceiver in accordance with claim 1, the transceiver being an RFID transceiver and the apparatus being an RFID transponder.

16. The transceiver in accordance with claim 15, the transceiver being an RFID reader.

17. The transceiver in accordance with claim 15, wherein the transmitter is configured to emit a carrier signal which can be modulated by the RFID transponder, the carrier signal comprising the first signal portion and the second signal portion.

18. A system comprising
a transceiver according to claim 1 for distance measurements between the transceiver and an apparatus, and the apparatus.

19. A system comprising:
a transceiver according to claim 1 for distance measurements between the transceiver and an apparatus, and the apparatus,
wherein the transceiver is an RFID transceiver, and
wherein the apparatus is an RFID transponder.

20. A method for distance measurements between a transceiver and an apparatus, the method comprising:
emitting a first signal portion to be emitted at a first center frequency and a second signal portion to be emitted at a second center frequency by a transmitter of the transceiver so that the first signal portion to be emitted is radiated back from the apparatus to the transceiver as a first reflected signal portion and so that the second signal portion to be emitted is radiated back from the apparatus to the transceiver as a second reflected signal portion,
receiving the first reflected signal portion radiated back from the apparatus to the transceiver by a receiver of the transceiver and receiving the second reflected signal portion radiated back from the apparatus to the transceiver by the receiver of the transceiver, and
determining a distance between the transceiver and the apparatus by a measuring module of the transceiver,
wherein the distance between the transceiver and the apparatus is determined by the measuring module of the transceiver in dependence on a first phase difference between a first phase position of the first signal portion to be emitted and a second phase position of the second signal portion to be emitted and in dependence on a second phase difference between a third phase position of the first reflected signal portion and a fourth phase position of the second reflected signal portion, and
wherein the distance between the transceiver and the apparatus is determined by the measuring module of the transceiver in dependence on the first phase difference and on the second phase difference such that the measuring module of the transceiver determines the distance between the transceiver and the apparatus in dependence on a difference between the second phase difference and the first phase difference.

21. A non-transitory digital storage medium having stored thereon a computer program for performing the method of claim 20 for distance measurements between a transceiver and an apparatus.

* * * * *